United States Patent [19]

Gruodis

[11] Patent Number: 4,584,519

[45] Date of Patent: Apr. 22, 1986

[54] INCREMENTAL TOUCH-OPERATED SWITCH

[75] Inventor: Victor Gruodis, River Vale, N.J.

[73] Assignee: Neris Coal Export Co., Inc., New York, N.Y.

[21] Appl. No.: 703,747

[22] Filed: Feb. 21, 1985

[51] Int. Cl.⁴ ............................................. H05B 37/02
[52] U.S. Cl. ..................................... 323/245; 323/300; 323/323; 323/904; 323/905; 307/116; 315/362
[58] Field of Search ......... 307/116; 315/362, DIG. 4; 323/236, 239, 241, 244, 245, 283, 300, 322, 323, 324, 904, 905

[56] References Cited

U.S. PATENT DOCUMENTS

| | | | |
|---|---|---|---|
| 3,129,344 | 4/1964 | Lemon, Jr. | 28/77 |
| 3,310,708 | 3/1967 | Seidler | 315/225 |
| 3,358,186 | 12/1967 | Nomura | 315/194 |
| 3,466,529 | 9/1969 | Grafhan | 323/327 |
| 3,564,284 | 2/1971 | Kamens | 307/232 |
| 3,573,582 | 4/1971 | Petrocelli | 318/305 |
| 3,666,988 | 5/1972 | Bellis | 315/208 |
| 3,715,623 | 2/1973 | Szabo | 315/194 |
| 3,766,431 | 10/1973 | Isaacs | 315/292 |
| 3,811,054 | 5/1974 | Wern et al. | 307/252 H |
| 3,919,596 | 11/1975 | Bellis | 315/294 |
| 4,081,700 | 3/1978 | Hamilton, II | 307/308 |
| 4,103,252 | 7/1978 | Bobick | 331/48 |
| 4,145,748 | 3/1979 | Eichelberger et al. | 364/862 |
| 4,210,822 | 7/1980 | Wern | 307/116 |
| 4,237,386 | 12/1980 | Instance | 307/116 |
| 4,246,494 | 1/1981 | Foreman et al. | 307/116 |
| 4,250,432 | 2/1981 | Kohler | 315/291 |
| 4,289,972 | 9/1981 | Wern | 307/116 |
| 4,356,432 | 10/1982 | Vinarub | 315/287 |
| 4,396,869 | 8/1983 | Rosenbaum et al. | 315/362 |

*Primary Examiner*—William H. Beha, Jr.
*Assistant Examiner*—Jeffrey Starrett
*Attorney, Agent, or Firm*—Bacon & Thomas

[57] ABSTRACT

This patent presents a touch-responsive switch which incrementally varies AC voltage supplied to an electrical apparatus. The invention includes digital circuitry which compares a control pulse train with a touch affected pulse train to create a switching pulse. The switching pulse is synchronous with the line frequency and controls truncating of individual cycles of line power to regulate voltage applied to an appliance as a function of the number of times a touch plate has been touched. The switching pulse also provides on/off switching as one of the available incremental steps. The circuit components are incorporated in an interface assembly which connects the appliance receptacle to a source of AC voltage.

20 Claims, 4 Drawing Figures

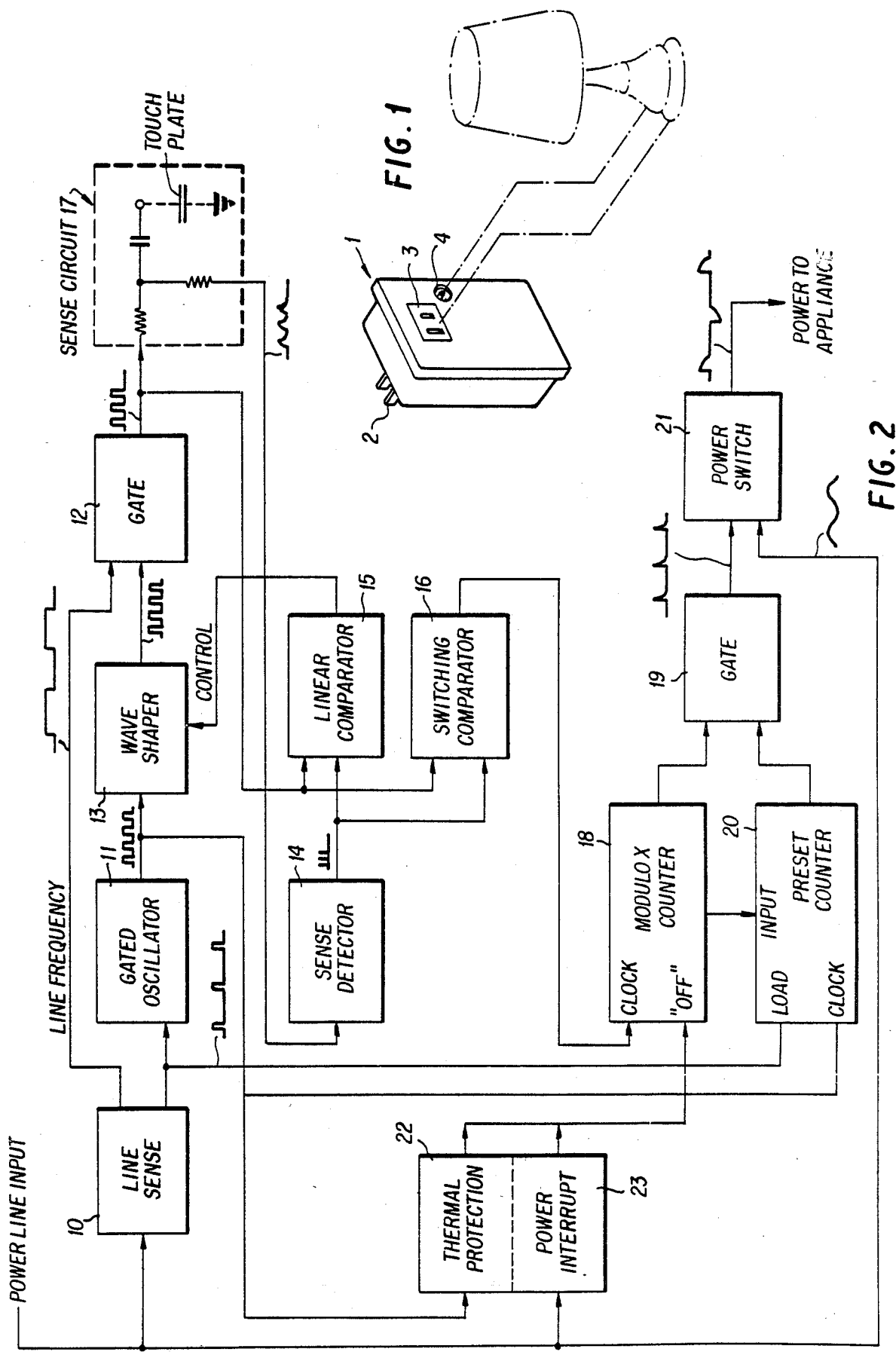

INCREMENTAL TOUCH-OPERATED SWITCH

This invention relates to variable intensity power switches responsive to capacitive changes resulting from human touch.

BACKGROUND OF THE INVENTION

Numerous types of touch-controlled electronic switches are available. They are generally reliable and safe but contain one or more drawbacks that are overcome by the present invention. For instance, T. Kohler, U.S. Pat. No. 4,250,432 on "Touch Dimmer Circuit" issued Feb. 10, 1981 is exemplary of the touch-controlled dimmer approach which utilizes a thyristor to control power to a load where the thyristor is selectively gated on by an integrated circuit responsive to a capacitive sensitive circuit or touch sensor. Such devices are incapable of providing discrete, repeatable power level stepping and are subject to over control which requires an operator to completely recycle the system in an attempt to achieve a desired level.

Wern in U.S. Pat. Nos. 3,811,054; 4,210,822; and 4,289,972 discloses a typical touch-responsive switching system for lighting installations relying on alternating current as a power source. Systems such as these require synchronization between the alternating current power source and switching control signals. To achieve the required synchronization, such devices bridge the alternating current supply and since they include relatively sensitive digital control circuitry, they are subject to damage in the event of current spikes which are common on supply lines.

Isaacs, U.S. Pat. No. 3,766,431 on "Lighting Control System Including An Analog-To-Digital Converter", which uses a digital store to control the brightness of a lamp, and G. Kappenhagen, U.S. Pat. No 3,874,460 on "Synthesis Of Dimmer Output Revisor Within The Dimmer Logic Circuit" are further examples of the use of overly complex and expensive circuitry to control current to an appliance.

T. Bobick, U.S. Pat. No. 4,103,252 "Capacitive Touch-Activated Transducer System Including A Plurality Of Oscillators" requires a plurality of oscillators and special geometry of the electrodes on the touch plate, all of which increase cost and reduce reliability.

W. Hamilton II, U.S. Pat. No. 4,081,700 on "Touch Control Switch Circuit With Compensation For Power Supply Line Fluctuations" teaches still another touch responsive means for controlling alternating current. In this system the alternating current induces a hum signal in a human body near the supply line. A touch receptor provides a hum signal which changes in amplitude when it picks up the additional hum signal from a human body touching the detector and this increase in amplitude is interpreted as a power supply control signal. Systems such as this are extremely delicate and subject to variations in performance resulting from differing electrical characteristics of different human bodies and cannot provide precise stepped intensity control.

R. Sherman, U.S. Pat. No. 4,287,468 on "Dimmer Control System" is representative of systems which utilize a digital memory to store predetermined bit sequences which represent different levels of power. A data signal representing the desired level of power is generated and synchronized with zero crossing of the voltage waveform of the power source being controlled. The resultant signal represents an address of the memory device storing the predetermined bit sequences and through this technique, the addressed memory device supplies a control input to a means for gating on a triac for a predetermined period of time during a power half cycle. Devices such as these are fairly complex and generally not responsive to touch control inputs.

N. Instance, U.S Pat. No. 4,237,386 on "Plug-In Module For Touch Control Switching" is exemplary of plug in modules for remote, touch responsive switching means. Such systems are similar to that presented by this patent but limited and more costly to produce because they require a specifically designed power plug for the appliance in combination with a control module that must be plugged into the specially designed appliance plug. In the present invention, control is provided by a single module which may be plugged into any standard AC outlet and to which any appliance utilizing a standard AC plug may be connected.

The fact that such a large number of different approaches to lamp control exists, as exemplified by the preceding examples, suggests that heretofore a satisfactory touch-responsive control has not been available.

OBJECTIVES OF THE INVENTION

It is a primary objective of the present invention to provide a touch-operated switch which provides on/off control combined with incremental power factor stepping for an electrical appliance such as a lighting fixture.

Another objective of the present invention is to provide a touch-responsive switching means for an appliance where the circuitry is contained in a module including a common AC receptacle male plug for connection to a wall outlet and a common AC female receptacle for receiving a standard appliance plug.

A still further objective of the present invention is to provide an incremental, touch-responsive dimmer control in which the touch responsive plate may be any arbitrarily selected, electrically conductive object.

Another objective of the present invention is to provide a touch-responsive, stepping dimmer control system which provides repeatable power level outputs for predetermined numbers of touch occurrences.

Another objective of the present invention is to provide a digitally controlled, stepping dimmer control including on/off functions which is economical to produce and highly reliable.

A still further objective of the present invention is to provide a touch-responsive, incremental power control system which may be used with any appliance within its power rating range that uses a standard AC receptacle.

The preceding, and other objectives of the present invention will become apparent in light of the specification, drawings and claims which follow.

SUMMARY OF THE INVENTION

The present invention is a touch-responsive power control system housed in a module which may be plugged into a standard AC wall outlet and which includes standard female receptacle to which appliances having standard plugs may be connected. The system utilizes a capacitive plate, touch-responsive technique wherein the capacitive plate may be any conductive object reasonably insulated from ground, such as the metal base of a lamp etc.

The system utilizes a gated oscillator that provides a square wave output having a frequency greater than the line voltage frequency. The square wave is processed by a wave shaper that produces a positive pulse for each cycle which has a width controlled by an analog voltage input. The output of the wave shaper is gated by a line polarity responsive gating means to the touch-responsive plate and a pair of comparators. An RC circuit, which includes the touch-responsive plate, provides a version of the pulsed output of the gating circuit which is altered as a function of the capacitive value of the touch plate. The altered pulse train is applied through a sense detector (level setting circuit) to both comparators. One comparator provides a control voltage for the wave shaper and the second comparator provides a clocking signal for a modulo x counter. The modulo x counter has a plurality of stable states, each of which represents a different intensity control, including an off state. The output of the modulo x counter controls a gate which passes the output of a second counter (which is responsive to the first counter and line voltage zero crossing), to a power controlling switch such as a triac. The gate is enabled by the second counter at a selected time relative to line voltage zero crossing as a function of state of the modulo x counter as incremented by a pulsed output from one of the comparators.

DESCRIPTION OF THE DRAWINGS

FIG. 1 is a perspective view of a preferred embodiment of the present invention.

FIG. 2 is a block diagram presenting the major electronic elements of the invention.

DETAILED DESCRIPTION OF THE INVENTION

Figure 3A:
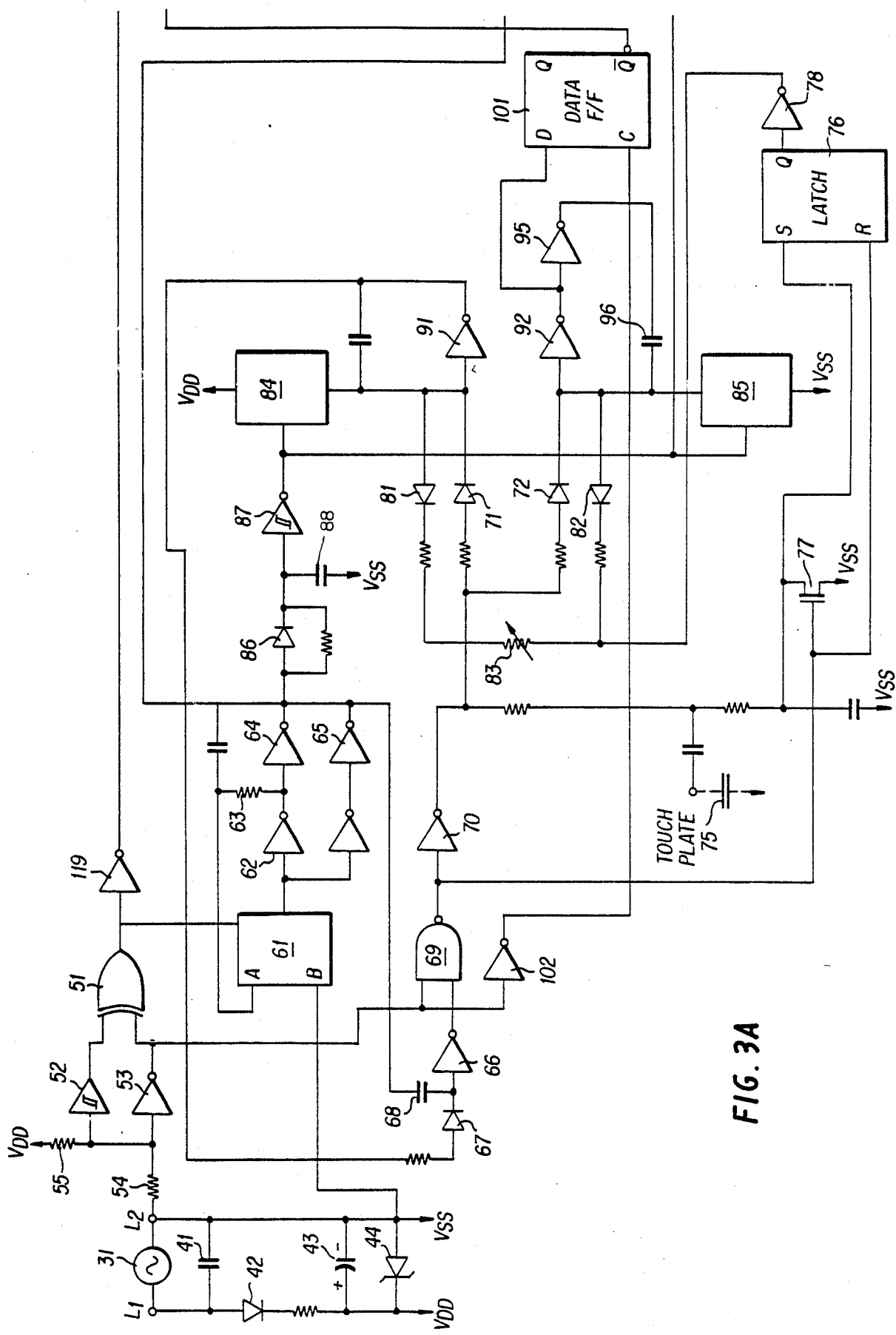
FIGS. 3A and 3B constitute a detailed schematic diagram of a preferred embodiment of the present invention.

FIG. 1 illustrates a preferred embodiment of the present invention where a triac and required passive components are housed in a module along with CMOS integrated circuitry containing the active circuit elements illustrated in FIGS. 3A and B. The housing module, 1, includes a polarized, standard AC plug 2 for use with a standard electrical outlet such as the wall receptacles normally used in dwellings. A standard, polarized female receptacle 3 is located on the opposite side of the housing where it may receive a standard appliance plug when the module is plugged into a wall outlet. A cable connector 4 is positioned in a convenient location on the receptacle side of the module for facilitating connection of the control circuitry inside the module to a remote touch plate.

In FIG. 2, the power line sense circuit, 10, has two outputs, a pulse every time the line voltage crosses zero and a square wave synchronized to the line voltage. The zero-crossing pulse triggers gated oscillator 11, which provides a square wave output at a frequency over 100 times greater than the line voltage frequency, and the square wave provides an enabling signal for square wave gate 12.

The square wave pulse train produced by gated oscillator 11 is applied to the wave shaper 13 which produces a positive pulse for each cycle of the square wave input. The pulse width of each output pulse from the wave shaper is inversely proportional to the magnitude of the control voltage received from the linear comparator 15.

The square wave pulse train produced by gated oscillator 11 is used also as a clock signal by the thermal protection gates 22.

The positive pulse train produced by wave shaper 13 passes through square wave gate 12 during positive half-cycles of the line voltage as a function of the gating pulses received from the power line sense circuit 10. The output of the gate is a reference pulse train and sense circuit stimuli that is applied to the linear comparator 15, switching comparator 16 and sense circuit 17 which includes an RC network and the sense detector or touch plate.

The touch plate is normally the body of a lamp fixture or other controlled appliance. Touching the fixture produces a change in capacitance, which modifies the signal at the output of the sense circuit. This modified signal is applied to the linear comparator 15 and switching comparator 16.

The sense detector 14 produces a pulse with a width controlled by the capacitive value of the touch plate for each output pulse of the sense circuit. Its output is applied to the linear comparator 15 which compares it to the reference pulse width and produces an analog function. When the reference pulse is longer, the output falls. When the sense pulse is longer, the output rises. This analog voltage controls the width of the pulses produced by the wave shaper 13.

The output of the sense detector is also applied to the switching comparator 16 which also compares the reference pulse width to the sense pulse width. If the sense pulse is longer or if the two pulse widths are balanced, the output from the circuit remains low. When the reference pulse width is longer for an extended period of time, the output switches to a positive potential and increments the modulo x counter 18.

If the pulses from the wave shaper 13 are too short to propagate past the sense circuit 17 to be detected by the sense detector 14, the linear comparator 15 is dominated by the reference signal. This forces the output from the linear comparator 15 to fall, in turn forcing the wave shaper 13 to increase its output pulse width. This feedback continues until the output from the sense detector 14 is of sufficient pulse width to match the reference signal. At this equilibrium point, the switching comparator 16 is adjusted to sit at a low output level.

Once equilibrium is achieved, touching the touch plate increases the sense circuit time constant and the output voltage of the sense circuit decreases. This causes the output from the sense detector to be shortened or eliminated. This activates both comparators. The switching comparator output switches to a positive output level and the linear comparator, which is designed to have slower response, starts to move down to force an increase in pulse shaper output to reach a new equilibrium point. At the new equilibrium point, the switching comparator switches back down and the output of linear comparator stabilizes.

The output of switching comparator 16 is applied to modulo X counter 18 which is a ring counter with a stable point for each desired state (i.e. one for each desired light intensity plus "off"). The counter is set to the "off" position in case of circuit overheat or whenever line power is interrupted for an extended time.

Touching the touch plate causes switching of the switching comparator which increments the modulo X counter 18, increasing it's state by one. Assuming that the appliance had been off previous to this touch, the change of count in the modulo X counter 18 opens gate 19 and allows the repeating count-up in preset counter 20 to produce a trigger pulse to gate on power switch 21. For the lowest light level, the control lines to the preset counter 20 from the modulo X counter 18 cause the preset counter to deliver the trigger pulse late in the half cycle of the line voltage.

The preset counter 20 is preloaded every time the line voltage goes through zero. After the loading, the counter counts input pulses from the gated oscillator 11 until maximum count, at which time a trigger output pulse is produced.

Power switch 21 turns on every time a trigger pulse is received and remains on until the line voltage goes to zero. The count in the modulo X counter 18 controls the arrival time of the trigger pulse and therefore controls the light intensity.

Releasing the touch plate causes the output of the sense detector 14 to increase. This activates the linear comparator 15 which seeks the original equilibrium point. The switching comparator 16 remains in the low state.

The next time the touch plate is touched, another positive pulse will be produced by the switching comparator, increasing the count in the modulo X counter. This will modify the input to the preset counter to force maximum count to be reached sooner in the half cycle, increasing the light intensity.

Subsequent touches will continue increasing the light intensity until the maximum count is reached in the modulo X counter. At this point gate 19 will inhibit the trigger pulses to the power switch, turning the appliance off.

Thermal protection circuit 22 is a safety circuit which prevents thermal runaway if the current draw of the load becomes larger than the rating of power switch 21. It is a low pass filter driven by gated oscillator 11. At room temperature, the circuit blocks the oscillator output, but at elevated temperatures, a capacitor with a large negative temperature coefficient allows the signal from the oscillator to pass. This signal drives the modulo X counter to the "off" state.

Power interrupt circuit 23 prevents the appliance from being turned on in case of a power interrupt. This circuit forces the "off" state whenever there is a prolonged power off condition where the status of the modulo X counter could be lost.

Figure 3B:
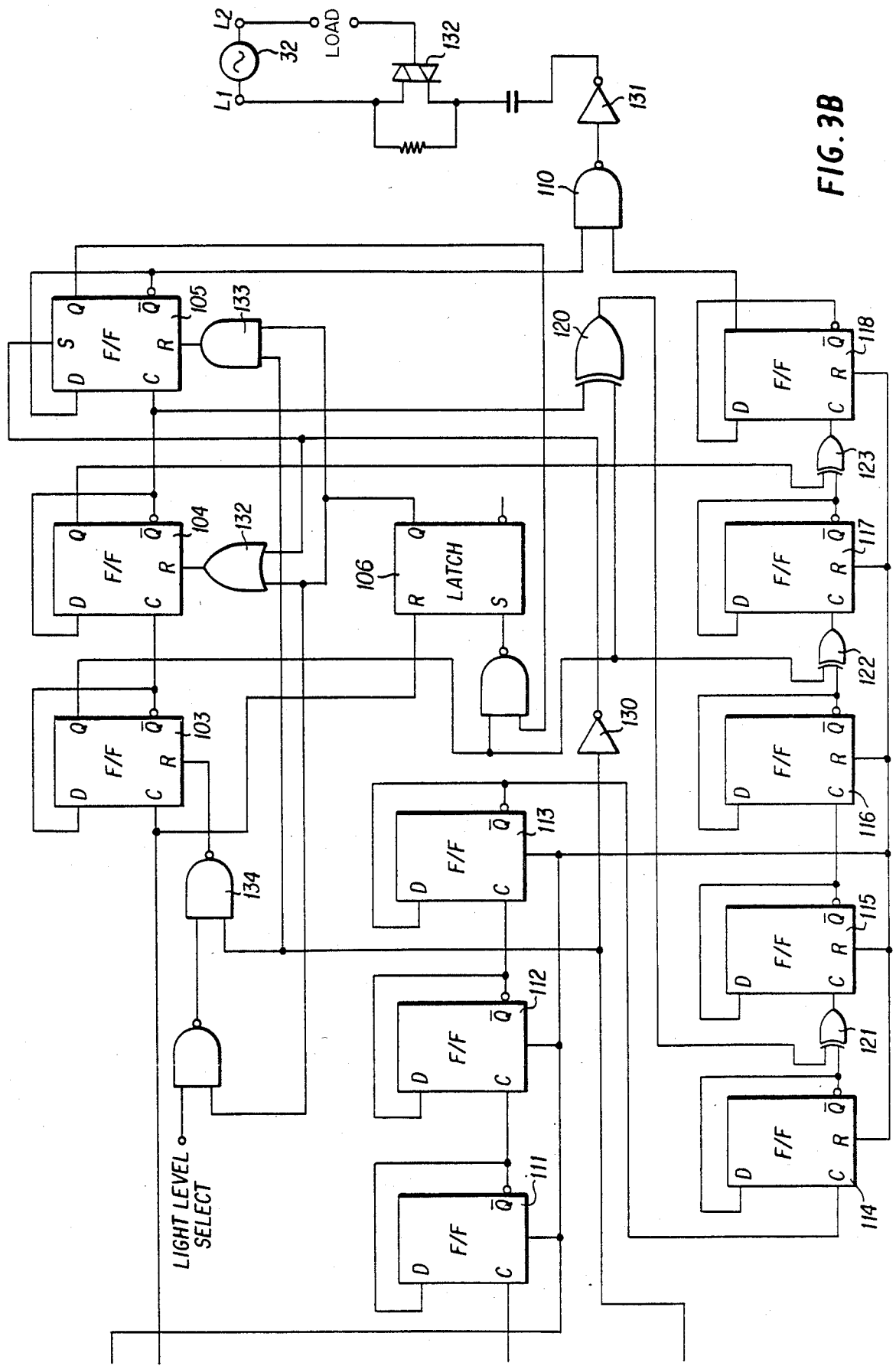

In FIG. 3A, 31 represents the male plug 2 of FIG. 1 and 32 of FIG. 3B represents the female receptacle to which the load is connected, i.e. 3 of FIG. 1.

Alternating current from the line source 31 is coupled to a DC power supply comprised of a radio frequency interference filter 41, a half wave rectifier 42, a ripple suppressing RC network including capacitor 43 and a regulating zener diode 44 of FIG. 3A. It is also coupled to the power line sense circuit, 10 of FIG. 2, which is comprised of exclusive OR gate 51 of FIG. 3A through a Schmidt trigger 52 and an inverter 53. Both the Schmidt trigger and inverter are coupled to the neutral, $L_2$, side of the line current in part via resistor 54 and to the positive DC output of the power supply VDD via resistor 55.

The output of exclusive OR gate 51 is applied to the clock input of multiplexer 61 which functions as a gated oscillator via the feedback circuit comprised of inverter 62 and resistor 63. The oscillator operates at a frequency which is at least one hundred times greater than the gating input provided by exclusive OR gate 51.

Inverters 64 and 65 provide a square wave output to a plurality of dependent circuits.

One of the dependent circuits is the wave shaper, 13 of FIG. 2 which includes inverter 66 of FIG. 3A. The input signal to inverter 66 is comprised of the pulse train from the gated oscillator via inverters 64 and 65 applied through capacitor 68 and a biasing potential from the linear comparator applied through biasing diode 67. The pulse train is applied with a polarity that causes the effective input to inverter 66 to vary inversely with the magnitude of the biasing signal so that the effective width of each pulse passing through inverter 66 decreases as the control input through diode 67 increases. This is due to the summing effect at the common junction between capacitor 68 and diode 67.

NAND gate 69 is gated on to pass the output of inverter 66 by the output of inverter 53 which causes the gate to be on during positive half cycles of the line voltage.

The pulse train passing through gate 69 during the positive half cycles of the line voltage is applied through inverter 70 as a reference pulse train to the linear comparator via diode 71 and the switching comparator via diode 72. The output of inverter 70 is also applied to an RC network which includes the touch plate 75. This network is coupled to the set input of latch flip-flop 76 which is part of the sense detector 14 of FIG. 2. The reset input to latch flip-flop 76 is provided by the output of gate 69 which also functions as a trigger for field effect device 77 which controls the set input to the latch from the common side of the DC power source. Thus the latch flip-flop 76 produces output pulses at the same rate as the output of NAND gate 69 but the width of the pulses is affected by the capacitance of touch plate 75 such that as the capacitance is increased, the pulse width of the latch flip-flop output decreases.

The output of latch flip-flop 76 is applied through inverter 78 to the linear comparator via diode 81 and to the switch comparator via diode 82. A potentiometer 83 provides adjustable attenuation of the pulse train as it is applied to the linear comparator so that the switching comparator can be adjusted to react faster than the linear comparator. The operating DC voltage for the linear comparator and switching comparator is provided through transmission gates 84 and 85 respectively. These gates are normally on but may be switched off as a precautionary and safety measure by the thermal protection and power interrupt circuit comprised of isolation diode 86 which couples the pulse train from the gated oscillator to gate open the transmission gates and inverting Schmidt trigger 87. A negative temperature coefficient capacitor 88 is tied between the common of the DC power source and the input to the inverting Schmidt trigger to bleed off the output of the gated oscillator as applied through diode 86 to effectively block the pulse train from reaching the inverted Schmidt trigger, thus causing the transmission gates to remain in their normally conductive states. When capacitor 88 is heated, as would be caused by an overload of the triac, its ability to absorb the pulse train is dissipated and inverting Schmidt trigger 87 opens transmission gates 84 and 85 to turn the system off.

The signals applied to the linear comparator via the oppositely poled diodes 71 and 81 are summed and applied through inverter 91 to diode 67 as the control reference potential for the wave shaper circuit. Thus as the summing point input to inverter 91 becomes more positive, the output becomes more negative and the width of the pulses passed through inverter 66 will increase. This feedback loop provides compensation for variations in the touch plate circuit and results in automatic stabilization of the system. The switching comparator comprised of diodes 72 and 82 and inverter 92 is similar to the linear comparator except its reaction to changes in the output of inverter 78 is more abrupt due to the positive feedback loop comprised of inverter 95 and capacitor 96.

The output of inverter 92 is applied to JK flip-flop 101 which acts as a data flip-flop that clocks the output of inverter 92 through to the modulo X counter as a function of inverter 102 which provides a clocking pulse associated with the positive half cycle of the line voltage and which functions as a means to register the output of the switching comparator with a zero crossing function of the line voltage.

The JK flip-flop 101 produces a single output pulse in response to a change in the output of inverter 78 caused by a decrease in the effective capacitance of touch plate 75. This increments the modulo X counter comprised of JK flip-flops 103, 104, and 105 and latch 106 each time touch plate 75 is touched. The inverse output of flip-flop 105 enables NAND gate 110 for a portion of the positive half cycle of the line voltage, the duration of the portion being a function of the count of the modulo X counter. That is, during the quiescent state of the modulo x counter, NAND gate 110 is inhibited, but as the counter is incremented, the period of time that the gate is inhibited decreases. At zero crossing of the positive half cycle of the line voltage, the counter is cleared.

The preset counter 20 of FIG. 2 includes eight flip-flops, 111 through 118 of FIG. 3B. The flip-flops are cascaded with respect to the primary clock input from the gated oscillator via inverters 64 and 65 and reset by the zero crossing of line voltage through the inverted output of line sense exclusive OR gate 51 as accomplished by inverter 119.

The count set in the modulo X counter presets the preset counter through exclusive OR gates 120, 121, 122 and 123 in response to the state of flip-flops 103, 104 and 105 so that when the modulo X counter is incremented to the first position, the output of the preset counter is such that NAND gate 110 will be trued or on for its shortest duration as measured from zero crossing at the end of the positive half cycle of the line voltage. The output of inverting Schmidt trigger 87 which controls the transmission gates for the comparators is also applied via inverter 130 to the set input of flip-flop 105 to turn the modulo X counter off and disable gate 110. When NAND gate 110 is true, buffer 131 gates on triac 132 and provides power to the load for a portion of the positive half cycle of line voltage which regulates average current to the load to provide the desired, stipulate dimming function.

In the event of a power interrupt, the output of inverting Schmidt trigger 87 is applied through inverter 130 to reset flip-flops 103 through 105 via gates 132, 133 and 134.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus for controlling the application of an AC voltage to a load, comprising:
    means for producing a square wave pulse train of greater frequency than but synchronized with the zero crossing of said AC voltage;
    means for producing a rectangular pulse with a duration set by the amplitude of a control voltage for each square wave of said square wave pulse train;
    means for passing said rectangular pulses as a reference pulse train during one-half cycle of each cycle of said AC voltage;
    a sense circuit for altering the individual pulses of said reference pulse train as a function of a physical occurrence;
    means for providing a sense signal when the output of said sense circuit changes;
    means for providing said control voltage for said means for producing a rectangular pulse train in response to said sense signal and said reference pulse train, the magnitude of said control voltage determined by the relative pulse width between the individual pulses of said reference pulse train and said sense signal;
    means for providing a clock pulse in response to a relative difference in pulse width between said sense signal and said reference pulse train;
    means for providing a first gate enabling pulse commencing at one of a plurality of preset points during each cycle of said AC voltage;
    means incremented by said clock pulse for producing a second gate enabling pulse and incrementing said means for providing said first gate enabling pulse whereby said first gate enabling pulse is caused to occur at a different one of said preset points;
    switch means for controlling the application of said AC voltage to said load; and
    means to for turning on said switch means during the simultaneous occurrence of said first and second gate enabling pulses.

2. An apparatus for controlling the application of an AC voltage to a load as defined in claim 1, wherein said means for producing a square wave pulse train includes a Schmidt trigger zero crossing detector and a gated oscillator.

3. An apparatus for controlling the application of an AC voltage to a load as defined in claim 2, wherein said means for producing a square wave pulse train operates at a frequency of at least one hundred times the frequency of said AC voltage.

4. An apparatus for controlling the application of an AC voltage to a load as defined in claim 1, wherein said means for producing a rectangular pulse includes a summing junction capacitively coupled to the output of said means for producing a square wave pulse train and coupled to said means for providing said control voltage via an isolation, biasing diode.

5. An apparatus for controlling the application of an AC voltage to a load as defined in claim 1, wherein said mean for passing said rectangular pulses as a reference pulse train includes means for producing an output during the simultaneous occurrence of output pulses from said means for producing a rectangular pulse and the positive half cycle of said AC voltage.

6. An apparatus for controlling the application of an AC voltage to a load as defined in claim 1, wherein said sense circuit includes a variable capacitive circuit.

7. An apparatus for controlling the application of an AC voltage to a load as defined in claim 1, wherein said means for providing a sense signal when the output of said sense circuit changes comprises a flip-flop latch set by said sense circuit and reset by said reference pulse train.

8. An apparatus for controlling the application of an AC voltage to a load as defined in claim 1, wherein said means for providing said control voltage includes a control voltage summing junction for said sense signal and said reference pulse train.

9. An apparatus for controlling the application of an AC voltage to a load as defined in claim 8, comprising thermally responsive means for applying an inhibiting pulse train to said control voltage summing junction.

10. An apparatus for controlling the application of an AC voltage to a load as defined in claim 1, wherein said means for providing a first gate enabling pulse includes a presettable counter comprised of a plurality of series interconnected flip-flops.

11. An apparatus for controlling the application of an AC voltage to a load as defined in claim 1, wherein said means incremented by said clock pulse comprises a counter including a series connected group of flip-flops.

12. An apparatus for controlling the application of an AC voltage to a load as defined in claim 11, wherein said means for incrementing said means for providing said first gate enabling pulse includes gate means interconnecting said series connected flip-flops of said means for producing said first gate enabling pulse and means responsive to the status of said means incremented by said clock pulse for enabling predetermined ones of said gate means whereby the effective length of the counter created by said series connected flip-flops is regulated.

13. An apparatus for controlling the application of an AC voltage to a load as defined in claim 1, wherein said switch means controls the application of said AC voltage as a function of zero crossing of the positive half cycle of said AC voltage.

14. An apparatus for controlling the application of an AC voltage to a load as defined in claim 1, wherein said means for turning on said switch means is stepped from the zero crossing of the positive half cycle of said AC voltage toward the beginning of said positive half cycle as said means for providing said first gate enabling pulse is incremented.

15. An apparatus for controlling the application of an AC voltage to a load as defined in claim 1, wherein said means for providing a clock pulse includes:

a clock forming summing junction for said sense signal and said reference pulse train; and
a flip-flop controlled by said clock forming summing junction.

16. An apparatus for controlling the application of an AC voltage to a load as defined in claim 15, comprising thermally responsive means for applying an inhibiting pulse train to said clock forming summing junction.

17. An apparatus for controlling the application of an AC voltage to a load, comprising:

means for producing a reference pulse train with a pulse duration set by the amplitude of a control voltage;
a sense circuit for altering the individual pulses of said reference pulse train as a function of a physical occurrence;
means for providing a sense signal when the output of said sense circuit changes;
means for providing said control voltage as a function of said sense signal and said reference pulse train;
means for providing a clock pulse in response to a relative difference in pulse width between said sense signal and said reference pulse train;
means for providing a first gate enabling pulse;
means incremented by said clock pulse for producing a second gate enabling pulse and incrementing said means for providing said first gate enabling pulse;
switch means for controlling the application of said AC voltage to said load; and
means for turning on said switch means during the simultaneous occurrence of said first and second gate enabling pulses.

18. An apparatus for controlling the application of an AC voltage to a load as defined in claim 17, wherein said switch means controls the application of said AC voltage as a function of zero crossing of the positive half cycle of said AC voltage.

19. An apparatus for controlling the application of an AC voltage to a load as defined in claim 17, wherein said means for turning on said switch means is stepped from the zero crossing of the positive half cycle of said AC voltage toward the beginning of said positive half cycle as said means for providing said first gate enabling pulse is incremented.

20. An apparatus for controlling the application of an AC voltage to a load as defined in claim 17, wherein said means for providing a first gate enabling pulse includes a presettable counter comprised of a plurality of series interconnected flip-flops.

* * * * *